Figure 1:
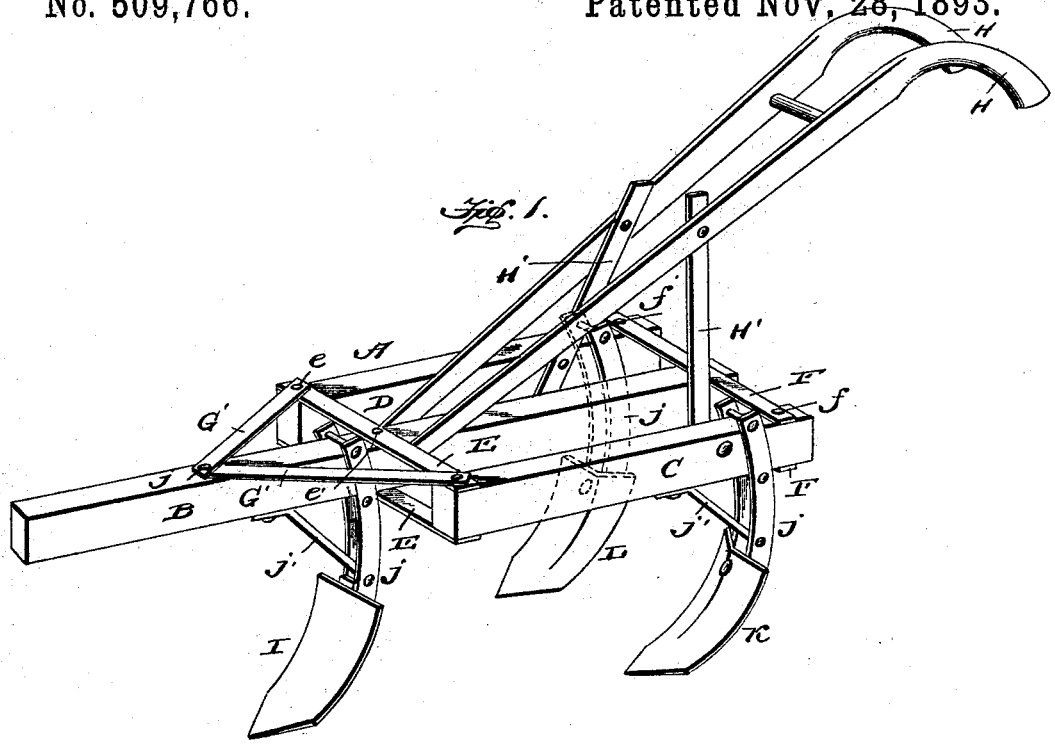

(No Model.) 2 Sheets—Sheet 1.

G. W. RANDOLPH.
CULTIVATOR AND PLANTER.

No. 509,766. Patented Nov. 28, 1893.

Witnesses:

George W. Randolph.
Inventor.
By Edson Bro's,
Att'ys.

THE NATIONAL LITHOGRAPHING COMPANY,
WASHINGTON, D. C.

(No Model.) 2 Sheets—Sheet 2.
G. W. RANDOLPH.
CULTIVATOR AND PLANTER.
No. 509,766. Patented Nov. 28, 1893.
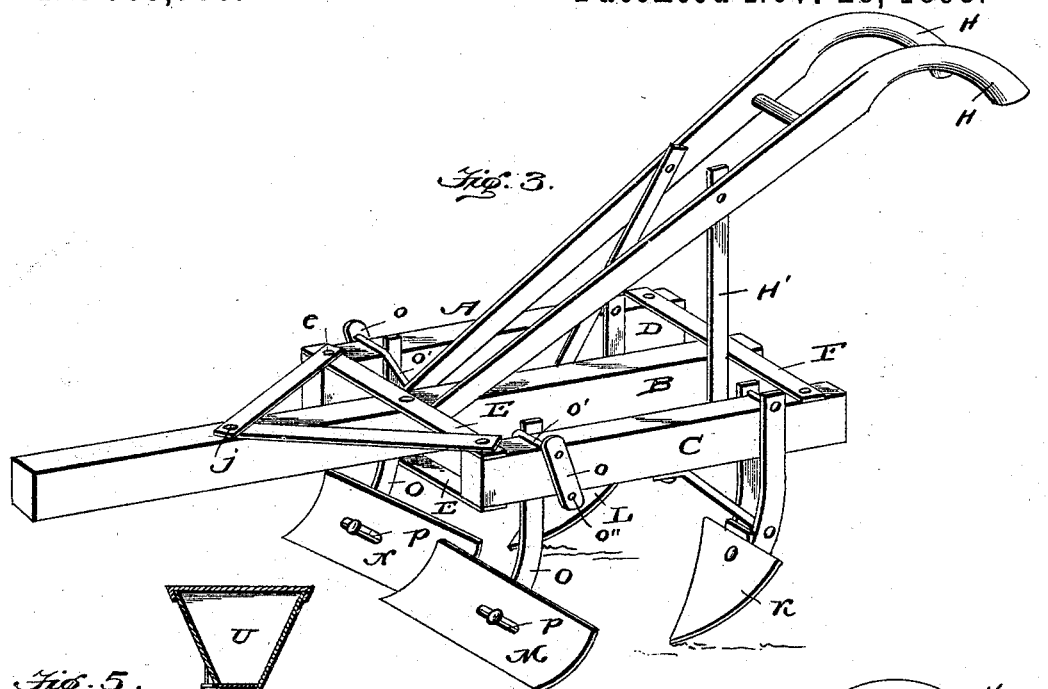
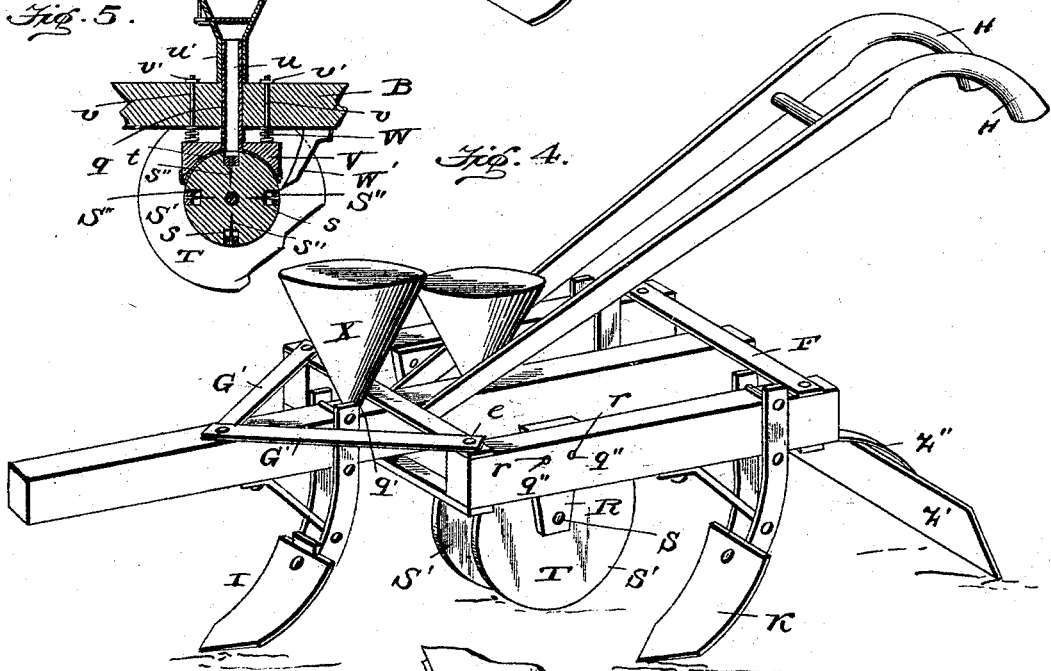
Witnesses:
Wm. C. Dashiell
H. F. Bernhard
George W. Randolph,
Inventor
By Edson Bros.
Att'ys.

UNITED STATES PATENT OFFICE.

GEORGE W. RANDOLPH, OF MEMPHIS, TENNESSEE, ASSIGNOR OF ONE-HALF TO JAMES M. SMITH, OF SAME PLACE.

CULTIVATOR AND PLANTER.

SPECIFICATION forming part of Letters Patent No. 509,766, dated November 28, 1893.

Application filed March 7, 1893. Serial No. 464,953. (No model.)

*To all whom it may concern:*

Be it known that I, GEORGE W. RANDOLPH, a citizen of the United States, residing at Memphis, in the county of Shelby and State of Tennessee, have invented certain new and useful Improvements in a Combined Lister, Corn-Planter, and Cultivator; and I do hereby declare the following to be a full, clear, and exact description of the invention, such as will enable others skilled in the art to which it appertains to make and use the same.

My present invention relates to a combined lister, corn planter and cultivator and it consists of the novel combination, construction and adaptation of parts which will be hereinafter fully described and particularly pointed out in the claims.

In listing the land preparatory to planting it is desirable to bed back on old cotton rows for the following reasons: The old bed is naturally the best ground as it may have been manured the previous year, and it is the loosest, warmest and driest land, which is also practically clear of grass seed. My improved implement has the rear plows adjusted to throw the dirt to the center and they serve as a brace to prevent the front plow from wobbling or moving laterally; and said rear plows may also be adjusted to the desired angle or depth to accommodate the cultivator to the team. The cultivator can be readily converted into a "buster" which is run in the middle of the row between the lists and the plows are arranged to throw the dirt opposite to and upon the sides of the lists, the rear plow serving to throw out the balance of the dirt in the middle of the row. It is to be noted that by bedding back on the old cotton bed, the grass seed will be turned by the "buster," to and upon the sides of the list and not on top of the same. I also adapt the implement for scraping the row, by means of scraper blades which are constructed to adjust them for scraping the cotton from one-half of an inch to three inches and at the same time the plows in rear of the scraper serve to hill up the cotton after it has been barred off and also cover up the grass in the middle of the row, leaving the ridge perfectly clear as there was no grass seed thrown back.

The corn planting mechanism can be used in connection with or applied to the cultivator frame; and said mechanism can be regulated to plant two, three or more grains of corn at varying distances from each other. I also provide mechanisms to prevent the escape and waste of the corn at the end of the row; to keep the planting wheel free from accumulations of dirt thereon, and to distribute fertilizer in regular quantities in the hills in advance of the grains of corn.

To enable others to readily understand my invention, I have illustrated the same in the accompanying drawings, forming a part of this specification, in which—

Figure 2:
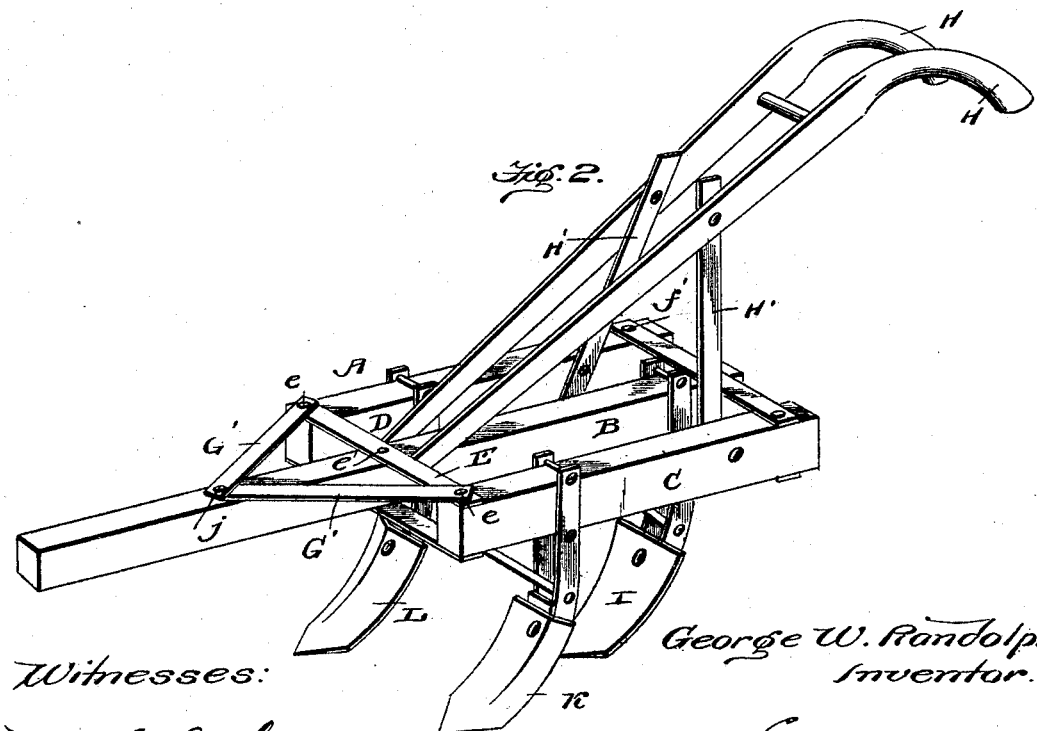

Figure 1 is a perspective view of the implement adjusted for service as a lister. Fig. 2 is a perspective view showing the buster cultivator. Fig. 3 is a like view of the scraper. Fig. 4 is a side elevation of the implement adapted for planting corn and distributing fertilizer. Fig. 5 is a sectional view through the corn planting mechanism. Fig. 6 is a detached detail view of the valved hopper for distributing fertilizer.

Like letters of reference denote like parts in all the figures of the drawings.

In my improved implement I employ a frame constructed with special reference to secure different adjustments of the plows or scrapers to suit the different kinds of work to be performed by the implement.

A designates the frame which consists of a central draft beam B, and the two side beams C, D, which are arranged parallel with and on opposite sides of the central draft beam B. The side beams C, D, are shorter than the draft beam B, the latter extending between the side beams and to the rear ends thereof. The front ends of the side beams are rigidly fastened to transverse metallic bars E, E, by means of the bolts $e$, and these transverse bars are arranged to bear against the lower and upper sides of the beams B, C, D, to which draft beam B they are rigidly secured by a vertical bolt or bolts, $e'$. A similar pair of transverse bars F, F, are arranged at right angles to the beams B, C, D, at the rear ends thereof, and these parallel bars are fastened to the beams by the vertical bolts $f, f'$, whereby a simple, rigid and substantial frame is produced. The draft beam is provided at its extended front end with the usual clevis not shown, and the front ends of the side beams C, D, are braced and strengthened by the inclined stays G', G', which are bolted to the side and central draft beams, respectively, as clearly shown in the several figures of the drawings.

H, H, are the handles of the implement, which are fastened to opposite sides of the central draft beam B by any suitable means, and these handles are braced or stayed by the upright bars H' which are bolted to the handles and the side beams of the frame.

In the implements shown by Figs. 1 and 2, I employ three plows or cultivator teeth, but the teeth shown in Fig. 1 are differently arranged from the teeth shown in Fig. 2, to adapt the implement to different kinds of work.

In the construction or adjustment shown by Fig. 1, I employ one front plow or tooth, I, and the rear plows or teeth K, L. The front plow or tooth I is carried by a foot or stock $j$ which is bolted to the central draft beam B in advance of the front ends of the two side beams C, D, and each of the two rear plows or teeth is likewise carried by the stock $j$, which is bolted or clamped to the side beam, near their rear ends, so that the rear plows are arranged on opposite sides of the line of work of the front plow or tooth I. Each of the stocks are braced by the inclined bars $j'$ attached to the same and to the beams of the implement. In this adjustment of the implement it is designed to list the land. To effect this end, the two rear plows are made right and left hand respectively, and these rear plows are slanted or inclined toward each other or toward the central line of the implement so as to throw the soil to the center. This lister serves to break all the land in the list, and does not leave any clods or hard ground on the list; besides this adjustment of the right and left hand plows facing toward each other serves to prevent the front plow from having lateral motion or "wobbling," thus adapting the implement to be run or guided in a straight line.

The implement shown by Fig. 2 has two plows K, L, arranged in advance of the single plow I, and this adjustment is especially useful as a "buster" plow designed to be run between the lists and throw the dirt opposite to and upon the sides of the lists while the rear plow throws out the dirt left by the front plows in the middle of the furrow. The two front plows are turned or slanted in opposite directions so that their rear neutral faces are presented to each other while their front working sides face toward the sides of the lists. The two front plows have their stocks fastened and braced to the side beams in the same manner as in Fig. 1, and the single rear plow is fastened to the rear part of the central draft beam; the two front plows, however, being arranged at about the middle of the two side beams. The implement when adjusted as a "buster" is run in the middle of the row between the lists, as stated, and it will be noted that by bedding back on the old bed the grass seed will be turned to the list by the "buster," upon the sides of the lists, and not on top of the same.

In Fig. 3 is shown a combined scraper and cultivator in which I employ the frame A constructed as hereinbefore described, the two rear plows or cultivator teeth K, L, and the diagonal scraper-blades M, N, which are arranged directly in advance of the path of the plows or teeth K, L. The diagonal scraper M is arranged in front of the other blade N and the latter is arranged at such distance to the rear and at one side of the front blade M as will enable the implement to straddle the row and adapt the blades M, N, to scrape both sides of the row. These blades are carried by stocks O which are clamped to the side beams C, D, by the inclined clamps $o$ that straddle the side beams and have their connecting bolts $o''$, $o'$, bearing against the front and rear edges of the stocks O. Each scraper blade is provided with a central longitudinal slot $p$, through which passes a headed bolt or screw that is secured in the lower extremity of the foot or stock O, and these blades can be adjusted on the stocks in the direction of their length in order to scrape the cotton from half of an inch ($\frac{1}{2}''$) to three inches ($3''$). The scrapers operate to clear the ridge or row of cotton plants, and at the same time the plows K, L, serve to hill up the cotton after it has been barred off and to cover up the grass in the middle of the row, leaving the ridge perfectly clean.

In Figs. 4 and 5, I have shown the corn planting and fertilizer distributing mechanism in connection with the lister cultivator.

To accommodate the corn planter and fertilizer distributer, the central draft beam B of the frame A is provided with two vertical passages or openings $q$, $q'$, which are formed in said draft beam B on opposite sides of the bars E, E, which connect the draft and side beams of the frame; and said side beams are each provided with transverse bolt holes, $q''$, the purpose of which will appear presently. Against the inner sides of the side beams C, D, of the frame A, are applied the hangers or brackets R, R, which are fastened to the beams by means of the bolts $r$, $r$, which pass through the bolt holes $q''$ in said side beams; and in the lower ends of these hangers or brackets is loosely mounted or journaled a shaft S which carries the planting wheel T, which is rigidly fixed to the shaft S and which is adapted to bear upon the ground to be rotated or turned by frictional contact therewith as the implement is drawn by the draft-animals. This planting wheel S is arranged immediately beneath the central draft beam B of the implement, and through the opening or passage $q$ in said draft beam passes a tube or conduit $u$ which has its upper end fitted around a depending spout $u'$ of a corn-hopper U, said tube or conduit having its lower end extending through a shoe V. This shoe is fitted against the lower side of the central draft beam B, and it is connected loosely thereto by means of the bolts $v, v$, which pass through suitable bolt-holes in the central draft beam and are provided with the nuts $v', v'$, on their upper ends which prevent the shoe from becoming detached from the beam B and also permit the bolts and shoe to have a limited vertical movement or play so that the shoe can bear or have contact with the periphery of the planting wheel to cut off escape and waste of the corn. The planting wheel is provided with the disks $S'$, $S'$, which are arranged at the sides of the wheel and are rigid therewith, and these disks $S'$ are of greater diameter than the wheel S so that the disks only ride upon the ground while the periphery of the wheel, proper, does not have contact with the ground. This wheel S is further provided with a series of spaced pockets, $s$, which are arranged radially thereof at suitable distances around the periphery of the wheel, and in these pockets are fitted the adjustable plugs or abutments $S''$ which fit snugly in the pockets and are held therein by means of the screws $s''$. These plugs or abutments $S''$ can be forced into the pockets so as to leave the outer ends of the pockets open to receive the grains of corn from the tube or conduit in the movable shoe, but the depth of these pockets can be varied to regulate the quantity of corn planted by the wheel S by simply adjusting the plugs or abutments into or out of the pockets, as is obvious. Again, the distance between the hills of corn can be regulated by increasing or diminishing the number of pockets in the planting wheel; thus certain of the plugs or abutments can be regulated in the pockets flush with the periphery of the planting wheel and thereby close some of the pockets, whereby the wheel S can be made to plant the corn in hills eleven, twenty-two and thirty-six inches apart, or other desirable distances. The lower side of the shoe V is made concave to fit upon the periphery of the planting wheel S, between its disks or flanges $S'$, and to protect the shoe from wear its lower concave face is sheathed with a metallic lining, at $t$. As the shoe is capable of a limited movement or play with respect to the periphery of the planting wheel, I provide the pressure springs W, W, which are fitted loosely around the bolts and are adapted to bear against the shoe and the lower side of the central draft beam, whereby the pressure springs serve to yieldingly hold the concave face of the shoe in contact with the periphery of the planting wheel which effectually prevents the escape and waste of the grains of the corn when turning the implement at the end of the rows. The tube or conduit through the shoe is arranged in the vertical line or plane of the pockets in the planting wheel, and as the pockets are brought into alignment with the tube or conduit when the planting wheel is rotated, the grains of corn are permitted to gravitate into the pockets, in which they are retained by the shoe until the pockets clear or pass beyond the end of the shoe.

X designates the fertilizer hopper which has a depending spout $x$ at its lower end, and this spout fits in and passes through the opening or passage $q'$ in the draft beam B. This hopper X is arranged in front or in advance of the corn hopper and planting mechanism in order to deposit the fertilizer in the furrow in advance of the grains of corn; and the quantity of fertilizer thus deposited in the furrow can be regulated or governed by means of the valve-plate $X'$ which is fitted in a slot $y$ formed in the side of the hopper. This valve plate is provided with a perforated ear Y through which passes the pivotal rod $Y'$ having its ends permanently fastened to the outside of the hopper, and said rod has an abutment or ledge $z$ upon which bears the perforated ear Y of the regulating valve. Said valve Y is further provided with a finger piece Z by which it can be conveniently adjusted to regulate the quantity of fertilizer which passes from the hopper through the spout.

The frame A has the cultivator teeth I, K, L, arranged as in Fig. 1, and the front tooth I serves to open the furrow into which the fertilizer and corn, either separately or together, is deposited, after which the rear cultivator teeth throw the loose dirt over the furrow and the corn is covered by means of the diagonal board $Z'$ which is carried by the spring arm $Z''$ attached to the rear end of the frame A.

To keep the planting wheel S free from accumulations of dirt or soil and from closing up the pockets therein, I provide the scraper block $W'$ which is situated in rear of the yielding shoe, said block being fixed to the central draft beam and has its lower end shaped to contact with the surface of the wheel S.

The operation and advantages of my invention will be readily understood and appreciated by those skilled in the art from the foregoing description taken in connection with the drawings.

I am aware that changes in the form and proportion of parts and details of construction of the devices herein shown and described as an embodiment of my invention can be made without departing from the spirit or sacrificing the advantages thereof, and I therefore reserve the right to make such changes and alterations as fairly fall within the scope of the same.

Having thus fully described my invention, what I claim as new, and desire to secure by Letters Patent, is—

1. The combination with a beam, of a hopper mounted on said beam, a shoe movably supported in relation to the beam and having a conduit arranged to receive seed from the hopper, and a planting wheel provided with pockets adapted to coincide with the conduit of said shoe, substantially as and for the purpose described.

2. The combination with a draft beam, of the hopper having its spout passing through the beam, a planting wheel provided with pockets in its periphery, and a movable shoe sustained by the beam and arranged in contact with said planting wheel, the shoe provided with a passage which connects with the spout of the hopper and discharges into the pocket or pockets of said planting wheel, substantially as described.

3. The combination with a draft beam and a planting wheel, of a spring pressed shoe loosely connected to the draft beam and normally held in contact with the periphery of the planting wheel, substantially as described.

4. The combination with a draft beam, of a hopper, a planting wheel, and a shoe provided with a concave face in contact with the periphery of the shoe and with a transverse passage, the bolts which loosely connect the shoe to the beam, and the springs which bear against the beam and the shoe, substantially as described.

5. The combination with a frame having a draft beam, a hopper having its spout fitted in an opening in said draft beam, the planting wheel provided with the flanges or disks and the radial pockets, the shoe provided with a tube that fits around the spout of the hopper, the bolts connecting the shoe loosely to the draft beam, and the springs for pressing the concave face or side of the shoe upon the planting wheel between its disks or flanges, substantially as described.

In testimony whereof I affix my signature in presence of two witnesses.

GEORGE W. RANDOLPH.

Witnesses:
H. T. BERNHARD,
W. CLARENCE DUVALL.